UNITED STATES PATENT OFFICE.

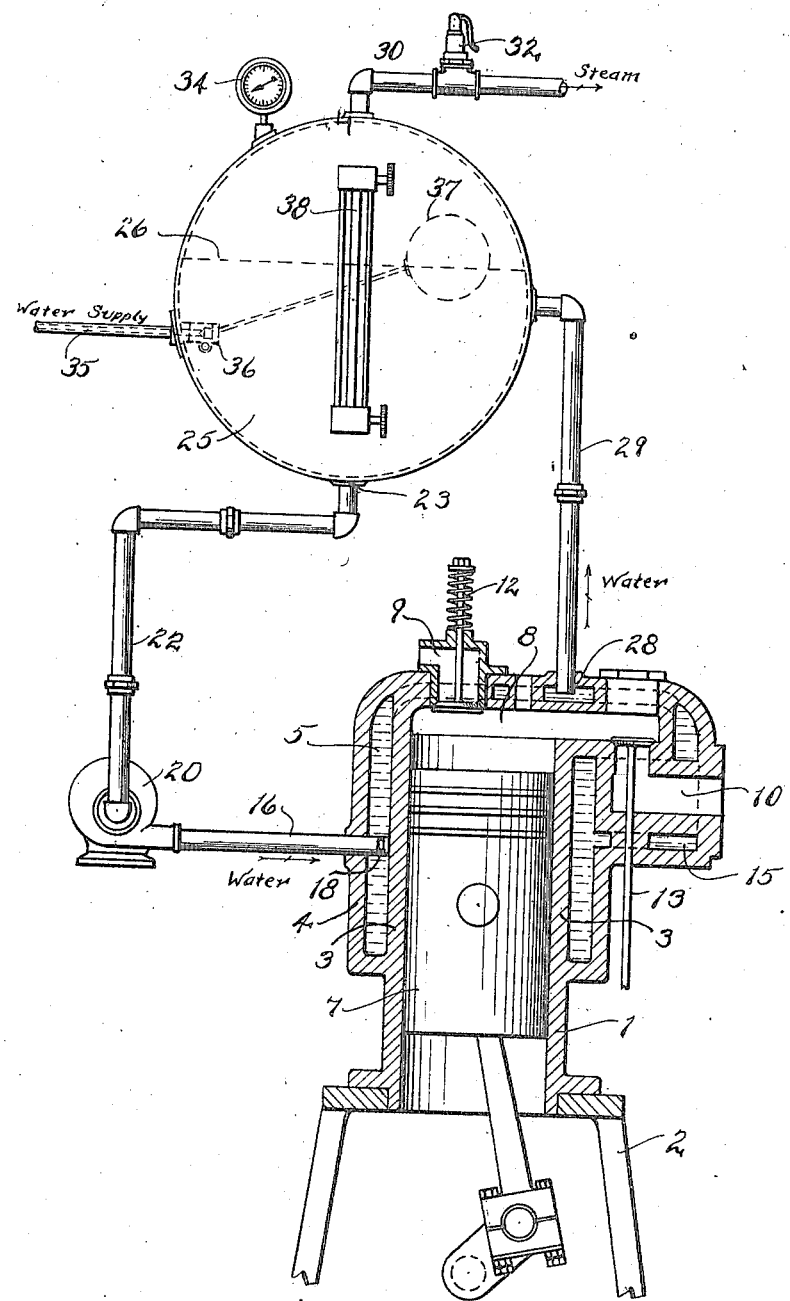

JOSEPH B. MERIAM, OF CLEVELAND, OHIO.

PROCESS OF WATER-JACKETING.

1,135,037.  Specification of Letters Patent.  Patented Apr. 13, 1915.

Application filed January 21, 1914. Serial No. 813,570.

*To all whom it may concern:*

Be it known that I, JOSEPH B. MERIAM, a citizen of the United States, residing at Cleveland, in the county of Cuyahoga and State of Ohio, have invented a certain new and useful Improvement in Processes of Water-Jacketing, of which the following is a full, clear, and exact description, reference being had to the accompanying drawings.

The general object of this invention is to increase the work obtained from fuel used in internal combustion engines. This is accomplished by a process of water jacketing the engine and utilizing the heated water in a way to provide better combustion within the engine, and recover a large portion of the heat from the jacketed water.

It has heretofore been the common practice to run water through the jacket in the internal combustion engine, comparatively slowly, at a temperature very materially below the boiling point, for it has been found that if the water rises much above 170° or 180° Fahrenheit, that undesirable results are produced within the engine, from the charring of lubricating oil, heating of the piston, etc. From my experiments, indicating that a much higher temperature of the cylinder wall could safely be used than that accompanying water at 170° in the jacket, the query arose, why should results be unsatisfactory with water at 190°? My experiments to answer that question, convinced me that the trouble heretofore has been that when the water reaches a temperature much in excess of 170°, steam bubbles are formed along the outer surface of the cylinder wall, which by adhering thereto practically insulate that wall from the water, so that the wall immediately receives a temperature very much in excess of that which is naturally associated with the temperature of the water. It seemed therefore, that if the formation and particularly the adherence of the steam bubbles could be prevented, water at much higher temperature—water considerable above boiling point—could be used with two advantageous results, namely: a more desirable and more efficient temperature may be maintained within the cylinder, and, second, the jacketed water may be used in the production of steam, for which there is usually a demand, without the plant using the engine. There is seldom a material demand for hot water below the boiling point.

I have discovered that I can satisfactorily prevent the adhesion and substantially prevent the formation of the undesirable steam bubbles, by forcing the water through the jacket at a/ comparatively high speed. When the water is so moved, it may be maintained at a temperature very materially above the boiling point, without the formation of the bubbles. By way of illustration, experiments have shown that with water flowing through the jacket at about 75 feet per minute, (the water flowing at approximately this speed around the jacket space for the greater portion of its area) the water may be at a temperature of 270° and still keep the cylinder wall cool enough to prevent undesirable results. The discharged water may be then used for the production of steam. Accordingly, a more efficient operation takes place in the engine, there being more complete combustion and less loss of heat into the water jacket, and of the heat which does not pass into the jacket, a large portion is recovered by way of steam, resulting in a very material increase in the total amount of work obtained for a given quantity of fuel.

My process is illustrated by the accompanying drawing, and is hereinafter more fully described in connection therewith. It is to be understood that the particular apparatus shown is simply an example of many embodiments which may be employed.

The drawing shows a vertical section through an engine cylinder with a piston therein and a suitable reservoir for the water and steam, and shows pipe connections from the reservoir to the cylinder, and from the cylinder back to the reservoir, and also shows a suitable pump for forcing the water through the cylinder jacket at the desired speed.

In the drawing 1 indicates the cylinder of an internal combustion engine, 2 the crank case upon which the cylinder is mounted, 3 the inner casing, 4 the outer casing between which is formed the water jacket 5. 7 indicates a piston movable in said inner casing, 8 is the explosion chamber and 9 and 10 are the inlet and exhaust ports respectively, adapted to be opened and closed by suitable valves 12 and 13 operated in the usual manner.

The water jacket 5 is extended around the exhaust passage as shown at 15, being in connection with the main portion of the water jacket. Leading to the intermediate portion of the jacket 5, through the outer casing 4, is a pipe 16 having its inner end abutting the inner casing 3, and being provided with a transverse slot 18, from which the water flows tangentially of the cylinder jacket. At the other end of this pipe is a suitable pump 20, indicated as a centrifugal pump, which may be driven in any suitable manner. Leading to this pump 20 is a pipe 22 which is in communication at 23 with the bottom of the reservoir 25. The reservoir is partially filled with water (indicated by broken line 26) which is drawn through the pipe 22 by means of the pump 20, and forced through the pipe 16 tangentially into the cylinder jacket through the slot 18. The water then flows preferably from the top of the cylinder at 28, upwardly through a pipe 29, and back into the reservoir 25, as shown. In this way the water is caused to pass rapidly around the inside of the cylinder jacket and thereby wipe off and prevent the formation of bubbles on the outer surface of the inner casing 3. The speed at which this water is passed through the cylinder jacket, varies at different points in the jacket, that is it flows fastest at a point adjacent the inlet pipe 16, and more slowly at either end of the jacket and around the exhaust passage, and then flows more rapidly again adjacent the outlet port 28.

I have found that in practice, the engine may be very efficiently run with the water in the jacket at about 270° Fahrenheit, and that steam is then rapidly formed in the reservoir 25, and I may carry a constant pressure in said reservoir from 30 to 40 pounds. It is to be understood that the figures mentioned herein, relating to the temperature and the speed of the water, and the pressure of the steam, are given merely as examples, and may vary greatly, and I do not wish to limit myself to them, although the speed of the water in the jacket is necessarily considerably faster than is ordinarily used.

Leading from the top of the reservoir, is a steam pipe 30, in which may be provided a suitable safety valve, indicated at 32. The reservoir may also be provided with a suitable gage 34, by which the pressure of steam is indicated, and by which may be ascertained approximately the temperature of the water in the jacket, the one being proportioned to the other.

As the water within the reservoir passes off in steam, more water is supplied to the reservoir from a suitable source, through a supply pipe 35, which is under the control of a valve 36 indicated in broken lines, and operated by a float indicated at 37, which keeps the water at approximately the same level in the reservoir. As a convenient means for ascertaining the level of the water in the reservoir, a sight glass 38 is mounted on the reservoir in communication with the interior thereof.

It will be seen from the foregoing description that by forcing the water through the cylinder jacket rapidly, as described, I prevent steam bubbles forming on and adhering to the outer surfaces of the inner casing and thereby insulating the body of the water in the jacket from this casing and preventing the effective cooling thereof. This allows the water to be used at a much higher temperature, so that steam is produced by heat which would otherwise have been wasted, thereby utilizing a greater portion of the energy in a given amount of fuel. It will also be seen that by running the engine with the interior of the cylinder at this somewhat higher temperature, fuel is more effectively burned and greater power is derived from a given amount of fuel on each explosion, thereby increasing the power developed by the engine. I also find by experiment, that the pressure of the water in the jacket, caused by the steam pressure in the reservoir also tends to prevent the formation of these steam bubbles which insulate the water from the inner jacket. Accordingly, by carrying a reasonable pressure of steam and by running the water through the cylinder jacket rapidly, in the manner described, I very effectively accomplish the desired results.

I claim—

1. The process of efficiently utilizing fuel in an internal combustion engine consisting of maintaining water in the water jacket at a temperature high enough to form steam while preventing the adherence of steam bubbles to the outer surface of the inner wall of the jacket.

2. The process of efficiently utilizing fuel in an internal combustion engine consisting of maintaining the water in the water jacket at a temperature high enough to form steam while running such water through the jacket with sufficient rapidity to prevent the formation and adherence of steam bubbles to the outer surface of the inner wall of the jacket.

3. The process of efficiently utilizing fuel in an internal combustion engine consisting of maintaining the water in the water jacket at a temperature high enough to form steam, running such water through the jacket with comparative rapidity to prevent the formation and adherence of steam bubbles to the inner wall of the jacket and allowing steam to form outside of the jacket.

4. The process of efficiently utilizing fuel in an internal combustion engine consisting of maintaining in the water jacket water at a temperature high enough to form steam, forcing the same through the jacket rapidly enough to prevent steam bubbles forming on and adhering to the inner wall of the jacket and then conducting such heated water to a reservoir.

5. The process of efficiently utilizing fuel in an internal combustion engine consisting of pumping water rapidly through the jacket from and back to a reservoir, rapidly enough to allow the water in the jacket and reservoir to be maintained at a temperature above 212°, by preventing the formation and adherence of steam bubbles to the inner wall of the jacket, while allowing the steam to separate from the water within the jacket.

In testimony whereof I hereunto affix my signature in the presence of two witnesses.

JOSEPH B. MERIAM.

Witnesses:
HARRY F. STAHL,
HOWARD W. PRICE.